Feb. 15, 1966    E. W. EWESON    3,235,369
FERMENTED FERTILIZER HAVING A GRANULAR STRUCTURE
AND THE METHOD FOR PRODUCING THE SAME
Filed June 29, 1962
2 Sheets-Sheet 1
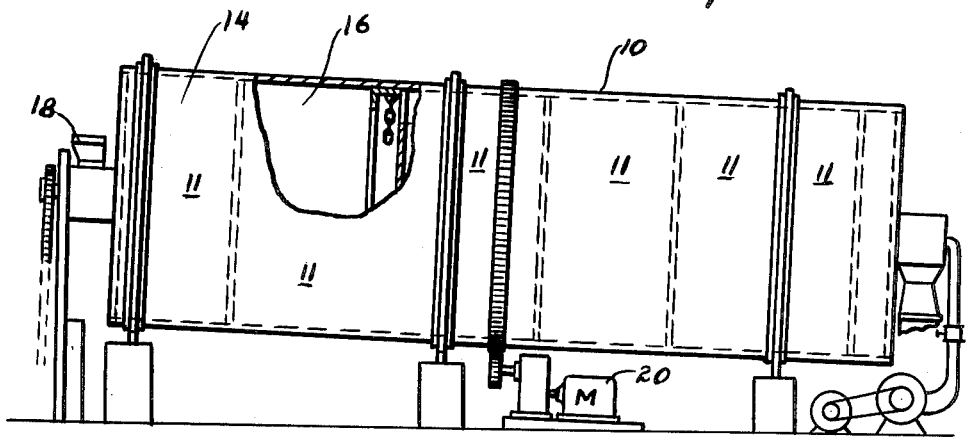
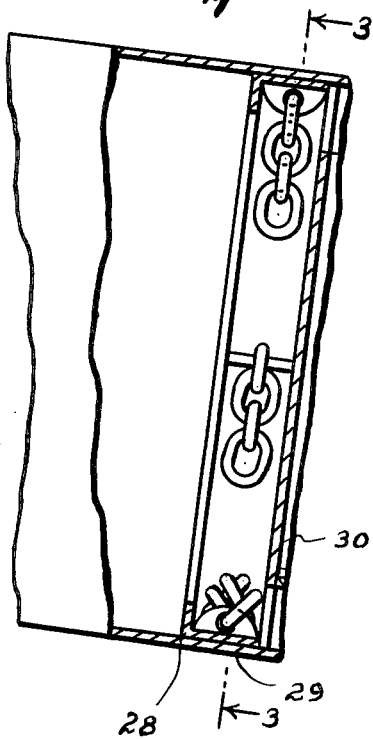
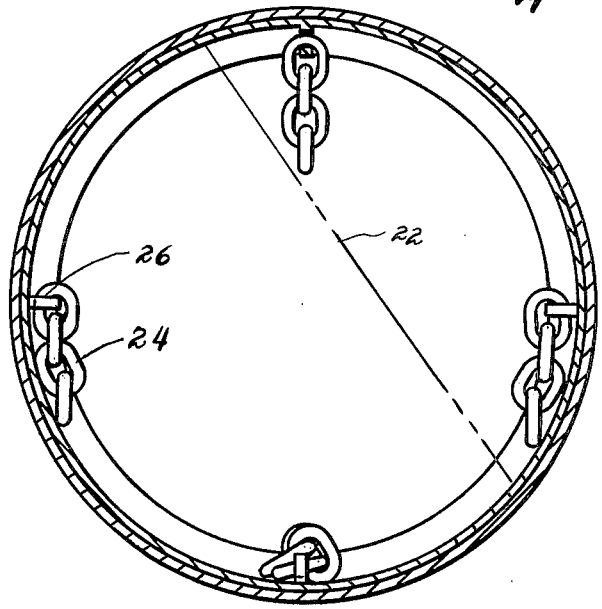
INVENTOR.
ERIC W. EWESON
BY
ATTORNEYS

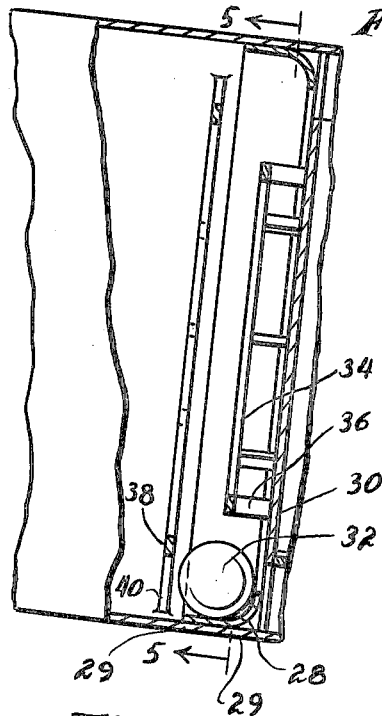
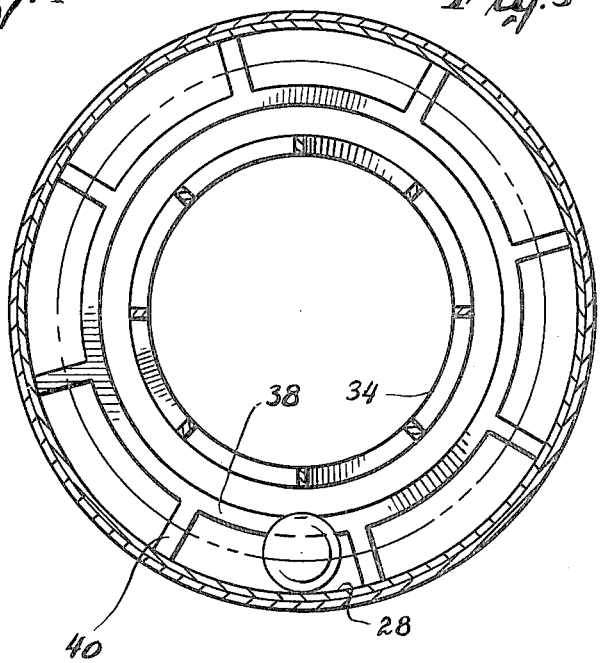
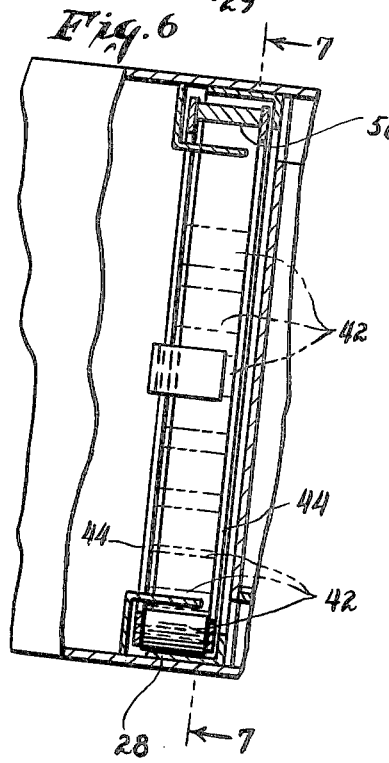
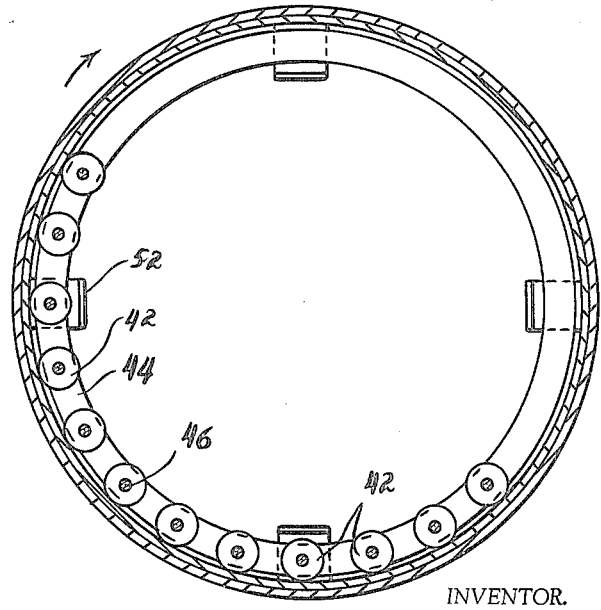
INVENTOR.
ERIC W. EWESON

United States Patent Office
3,235,369
Patented Feb. 15, 1966

3,235,369
FERMENTED FERTILIZER HAVING A GRANULAR STRUCTURE AND THE METHOD FOR PRODUCING THE SAME
Eric W. Eweson, New York, N.Y., assignor to International Eweson Corporation, Pine Plains, N.Y., a corporation of New York
Filed June 29, 1962, Ser. No. 211,150
4 Claims. (Cl. 71—9)

This invention relates to an improved method for the manufacture of organic fertilizers by fermentation in which silica mineral particles are employed to obtain a granular fertilizer structure.

Organic fertilizer produced by fermentation are normally powdery or finely fibrous. This characteristic structure of the fermented fertilizer creates difficulties in handling by forming lumps during storage and by bridging or otherwise clogging in hoppers and related handling equipment. Such problems exist even at moisture contents as low as 25%, which is relatively dry for organic fertilizers. Therefore, such fertilizer is difficult to handle by mechanical equipment such as automatic scales, bagging machines and mechanical spreaders. Being of low specific weight, such powdery or finely fibrous organic fertilizers create objectionable dust whenever handled and are blown away by even slight winds when applied to the soil.

Pelletizing equipment is, of course, known to the art particularly in the field of pelletizing chemical fertilizers and dry, ground alfalfa. Such machines are, of course, relatively expensive and they introduce an additional manufacturing process which does not in any way improve the intrinsic value of the fertilizer.

It is, therefore, a primary object of the present invention to provide an improved method for the manufacture of organic fertilizers by fermentation in which silica mineral particles are employed to achieve a granular structure in the fermented fertilizer.

It is a further object of this invention to provide an improved method and apparatus for the processing of refuse containing glass in which the glass is ground to the desired particle size and serves as the nucleus for the aggregation of the fermenting material thereto to provide a granular structure in the fermented fertilizer.

In accordance with these objects, there is provided, in a preferred embodiment of this invention, a method of making organic fertilizers in which fine silica mineral particles are mixed with the organic material. The resultant mixture is subjected to an aerobic microbial fermentation by the known methods. During the fermentation, the fermenting mass is processed so as to reach a temperature of at least 55° C. and $CO_2$ concentration of at least 6%. The fermenting mass of colloidal organic substance and microbial tissue will adhere to the particles of silica mineral and cause the resultant fertilizer to be granular in structure.

I have found it desirable to use from 30 to 60 kg. of silica mineral particles to each 1000 kg. of organic material. The silica mineral particles are preferably no larger than that passed by a 25 mesh screen (i.e. having openings of about 0.8 x 0.8 mm.). For example, medium grain beach sand may be used. The length of time for fermentation depends on the intensity of activity. In a modern multi-stage rotary digestor as, for example, set forth in my co-pending application Serial No. 29,707, filed May 17, 1961, now Patent No. 3,138,447 for Method and Apparatus for Making Organic Fertilizer, fermentation will start within 24 hours and be completed within approximately 72 hours to 96 hours thereafter. In an ordinary compost heap, the process will require from 2 to 6 months.

While silica minerals may generally serve as a granulating media, a preferred material is derived from ordinary commercial glass. The glass is softer than other inexpensive silica materials as a result of the fusion of the crystalline silicon with one or more alkalis in the glass melting process to render the glass non-crystalline. As a result, the glass is less resistant to decomposition by the acids, notably the carbonic acid, generated through the microbial activities during fermentation. Other inexpensive silica material can be obtained from coal ashes, medium fine beach sand, and green-sand. Natural rock phosphate, although lower in silica content, is also a useful granulating agent and may be preferred when it is desired that the fertilizer have a high phosphor content.

Whatever the material, it should be ground to provide small particles passing through a 25 mesh screen. Particle size, on the other hand, must not be too fine. For example, clay has a particle size ranging from 0.0002 to 0.002 mm. Such particles are too fine to give the desired granulation.

In addition, ground porcelain or pottery can be used even though manufactured from finer clay as long as they are ground to 25 mesh size and not broken up to the original particle size. The basic principle is that the silica mineral particles should be microbiologically non-toxic and ground to expose a suitably large surface.

All the silica minerals mentioned above contain, in addition to silicon, also other microbial nutrient elements. Glass, for instance, normally contains compounds of potassium, magnesium, phosphorus, boron, copper, sodium and manganese, all of which are subject to slow breakdown by the organic acids generated during the fermentation for utilization by the micro-organisms in their buildup of cell tissue. Some of the other silica materials have even greater proportions and variety of microbial nutrients than the glass. It is now well recognized that a desirable and intensive development of the enormously complex activities of the microbial flora depends not only on the presence of the principal nutrient elements but to an appreciable extent also on the so-called minor or trace elements. It is, thus, that the largest possible variety of microbial nutrient elements is not merely desirable but basic for the synthesis of a high quality organic fertilizer, especially when produced from organic materials that are significantly lacking in such nutrients, as exemplified by municipal refuse, the major component of which is paper products, or practically pure cellulose.

To manufacture granulated organic fertilizer or soil conditioner with increased mineral content from common municipal refuse or similar mixtures of organic and inorganic materials, I proceed in a somewhat modified manner. This type of refuse consists mainly of paper products and food wastes, the former normally more than twice as much as the latter by weight. In addition, it contains substantial proportions of metals, plastics, rubber and other non-fermentable materials, which should be segregated for salvage or other forms of disposal before the refuse is subjected to fermentation. However, such refuse also normally contains considerable proportions of glass, porcelain, pottery, and sometimes coal ashes, all of which up to now have been considered very undesirable components of the refuse when intended for use as raw material for the manufacture of organic fertilizers and soil conditioners. For this reason, such material has been carefully sorted out of the refuse or the finished product. In either case, sorting can be accomplished only at excessive costs for labor and special equipment, for which there is little or no compensation by way of salvage value. As a result, current fertilizers and soil conditioners made from municipal refuse or the like almost invariably contain appreciable quantities of very objectionable, fairly large, sharp particles of glass, porcelain and pottery. To grind the entire refuse with its contents of glass, etc., sufficiently fine for the glass, etc. to serve as granulating agents, is entirely impractical. Further, finely ground organic materials are unsuitable for efficient microbial decomposition as they tend to form large balls or pack too much. To grind the finished fertilizer sufficiently fine to render the glass, etc. less objectionable and thereupon cause granulation in special machinery of known design, is of course, very costly.

To solve this problem of objectionable glass and coal ashes in municipal refuse and to obtain at the same time the desired silicon materials for making granular fertilizer, I introduce the unground or very coarsely ground refuse with its normal content of glass, etc. in a horizontal, slowly rotating fermentor or kiln, which may be slightly inclined horizontally. Such kiln should, for best efficiency, have a diameter of from about 3 to 4½ m. and length of 10 m. or more, depending on the quantity of refuse to be handled, it being important to note that the quantity of refuse processed in the drum must not exceed 75% of its volumetric capacity. If the refuse should contain more than about 6% of glass, etc. by weight, I may sort out the surplus in form of easily handled unbroken bottles or other large pieces, but this is not necessary as I can use up to about 10% glass, etc. without any serious adverse effect on the finished product. The quantity of porcelain and pottery in the refuse is normally very small compared with the glass and does, therefore, not cause any problem. Excessive proportions of coal ashes in the refuse during the cold winter months, which is common in many European countries, must be eliminated to avoid any undue lowering of the quality of the finished product.

After having introduced the refuse with its content of glass, etc. at the upper end of the rotating fermentor or kiln, I let the mass tumble therein for some 8 to 24 hours, whereby with the aid of the sharp edges of the glass, etc. the organic refuse is efficiently ground to a rather uniform particle size, seldom exceeding 2½ cm. across and, thus, very suitable for fermentation. The actual time required for this grinding depends obviously also on the speed at which the kiln revolves; good results are obtained in a kiln with a diameter of 3 to 4½ m. and a length of 10 m. or more revolving at a speed of ¼ of 1 revolution per minute; higher speeds will result in faster grinding, but will cause considerable wear and mechanical strain on such large kilns and are therefore not recommended.

While performing its function in the kiln of aiding the grinding of the organic refuse, the glass, etc., also becomes somewhat reduced in particle size so that relatively few pieces measure more than 5 cm. across and most of them vary from ½ to 2 cm. across. However, as even such grinding leaves the glass, etc. much too coarse to induce granulation of the fertilizer, means must be provided for a supplementary fine grinding thereof without any appreciable further grinding of the organic materials, which, as already stated, tends to make them less suitable for the desired microbial decomposition.

The ground mass is then preferably transferred to a second chamber which is also inclined from the horizontal. The glass will tend to concentrate at the lower end of the digestor due to the higher specific weight thereof. Grinding elements are provided at this position in the digestor to grind the glass to the desired particle size. After grinding, the entire mass is then transferred to a fermentation chamber in which the temperature is made to reach at least 55° C. and the $CO_2$ concentration made to reach at least 6%. Fermentation in this chamber will cause an aggregation of the fermented substance with the silica particles thereby to produce a fertilizer having a granular structure. In addition to the granulation of the material, the trace elements augment the nutrient content of the fertilizer in desirable fashion.

Having briefly described this invention, it will be described in greater detail in the following portions of the specification, which may best be understood by reference to the accompanying figures, of which:

FIGURE 1 is a partially sectioned rotary digestor for producing granulated fertilizer in accordance with the present invention;

FIG. 2 is an enlarged sectioned view of a portion of the apparatus shown in FIG. 1;

FIG. 3 is a cross sectioned view taken along lines 3—3 of FIG. 2;

FIG. 4 is a partially sectioned view of another embodiment of the present invention;

FIG. 5 is a cross sectioned view taken along lines 5—5 of FIG. 4;

FIG. 6 is a partially sectioned view of still another embodiment of this invention; and FIG. 7 is a cross sectioned view taken along lines 7—7 of FIG. 6.

Referring to FIGS. 1–3, there is shown a modern rotary digestor 10 for the manufacture of fertilizer from material such as residential refuse, modified in accordance with the present invention.

The digestor 10 consists of a plurality of fermentation chambers 11, the atmosphere of which may be controlled for optimum conditions for the production of the microbial species predominating in each step of the overall processing. The material is transferred from chamber to chamber without exposure to the atmosphere. For a detailed description of such digestors, reference is made to my co-pending application Serial No. 29,707, filed May 17, 1961, now Patent No. 3,138,447 for Method and Apparatus for Making Organic Fertilizer which is incorporated herein by reference.

As set forth in the brief description, if the material in the digestor is selected from natural organic material, I would add silica mineral particles, such as ground glass or sand, screened to 25 mesh size, to the material in fermentation chamber 11. The quantity of silicates would be 3–10% of the weight of material. The digestor would then be regulated so that the fermenting mass reached at least 55° C. at a $CO_2$ concentration of at least 6%. The resultant product would have a granular structure.

However, for use with residential refuse, compartments 14 and 16 are provided. The refuse is normally segregated to remove the non-fermentable material except glass and other silica minerals and the material then charged into the compartment 14 through hopper 18. The digestor is rotated by motor 20. The digestor is then rotated for coarse grinding of the material into desirable sizes. The large pieces of broken glass, etc. assists in this process.

The material is then transferred to compartment 16, by transfer buckets or other means known to the art and, thus, not illustrated.

The material occupies about 75% of the volume of compartment 16 and becomes inclined due to drum rotation as illustrated by line 22. The inclination from the horizontal, coupled with drum rotation, will cause the glass to move through the refuse to the lower end of the compartment due to the higher specific weight of the glass.

Lengths of chain 24 are spaced about the drum periphery by coupling one end of the chain to eyes 26 equally spaced about the drum. As the drum rotates, the chain lengths will be drawn through the refuse to crush the glass between the links and between the chain and the drum walls.

Instead of four separate lengths of chain as shown, I may have one chain of approximately the same length as the circumference of the kiln, not attached at fixed points to the kiln, but merely held to the wall by loops at four or more points so that it is free to move slower than the kiln wall which it will tend to do from being held back by the material in process.

A channel 28 may be provided to reinforce the wall 29 and end wall 30 of the drum.

FIGS. 4 and 5 show another method for crushing the glass etc. into desired fineness. Here, the crushing is made by one or more balls 32 of steel or any other hard and heavy material. By the rotation of the drum and the slight inclination of same, such ball or balls, which may be up to 30 cm. in diameter when they will weigh about 100 kg. each, will crush the brittle glass against side wall 29 and end wall 30 of the drum. A circular band 34 of steel of suitable strength attached to end wall 30 by supports 36 prevents the balls from rising in the tumbling mass of refuse. Similarly, another circular steel band 38 with somewhat larger diameter is attached by supports 40 to side wall 29 in order to prevent the ball or balls from moving away from end wall 30. Without such guards, the balls will gradually move up and sideways towards the center of the drum and the tumbling mass, which would largely void desired crushing action.

FIGS. 6 and 7 show still another method for crushing the glass by a number of heavy rollers 42 of suitable length and diameter, held for rotation between two circular steel rings 44 of slightly smaller diameter than the kiln to form a crushing unit. The rollers have shafts 46 which fit into suitable spaced holes in rings 44 so that the rollers 42 can rotate freely. Braces 50 hold the rings together firmly to prevent rollers 42 from coming loose. The rollers are spaced apart by a distance of about twice their diameter, but are located only on about one half of the circumference of the rings. By gravity the rollers will, thus, tend to retain a position near the lower half of the kiln for the most effective crushing effect against the kiln wall. In order to hold the crushing unit from moving sideways, four or more guard channels 52 are attached to the kiln wall.

Suitably shaped channels of steel 28 may be provided as paths around the kiln wall for the chain, balls and rollers, which will increase their crushing efficiency and prevent excessive wear on the kiln.

Sometimes, especially in kiln with large capacity, I may use more than one type of crushing means. I may, for example, do the initial crushing with chains and follow up with balls or rollers for the final crushing, all of which may be done in the same one-compartment kiln or in different compartments of a kiln.

All the above described methods for crushing the silica particles are based on the fact that the wall of the rotating kiln moves faster than most of the mass of material in process, which is held back by the force of gravity (being greater than the friction between the kiln wall and the mass at approximately a 60° angle against the horizontal which is the angle of repose of the mass and at which it will remain during the rotation of the kiln). It is, thus, that the chains, balls and rollers will also be held back and crush the brittle silica particles, which by their higher specific weight than the organic materials will tend to gravitate and collect at the bottom of the tumbling mass.

After the glass etc. is suitably crushed, the refuse mixture is ready for fermentation, and may be transferred to compartment 11 of FIG. 1 or may be transferred to other types of fermentation apparatuses or to piles after the refuse mixture is discharged from the kiln. Operating a kiln with two or more compartments, the best procedure is usually to provide for the initial coarse grinding of the mixture in the first compartment and introduce the means for the supplementary fine crushing of the glass, etc. in the first part of the second compartment with the fermentation to follow in the rest of the kiln.

A single compartment drum can be used for coarse grinding of the refuse and grinding of the silica material at the low end thereof. After grinding, the material will be discharged for fermentation as, for example, in well managed compost heaps or other fermentation processes.

The efficiency of my granulation method depends obviously to a considerable extent on the intensity of the fermentation that the mixture is subjected to. It is, thus, that in addition to the said rise in the temperature to at least 55° C. as indication of high microbial development there should also be a simultaneous increase in the carbon dioxide concentration of the air in the fermenting mass to at least 6% or some 150 times that of fresh atmospheric air. Such high $CO_2$ concentration with the necessary continuous formation of carbonic acid should be maintained for the approximate duration of the high temperatures, which is attained by proper control of the air supply as well known by persons familiar with the art of fermenting organic materials in specially designed fermentors or in old-fashioned piles.

I am as yet unable to state exactly what causes the fine silicon particles to induce the granular structure of the fertilizer. There appears to be several likely causes: silicon is a microbial nutrient, as well as a plant nutrient, which in the form contained in quartz sand, glass, coal ashes, greensand, etc. though highly resistant, can be decomposed and utilized by the type of microorganisms that cause fermentation and humification of organic materials; this by itself may explain the affinity for attraction between the silica particles and the fermented organic substances. A specific manifestation of such attraction can be observed in most fertile soils in respect to various fungi, which abound in present type of fermentations, namely that the hyphi of the mycelia reach out to encircle and adhere to fine silica particles like sand and fine gravel. Thus, by adhering to the colloidal humus substance, the silica particles tend to counteract formation of large aggregates or cause them to break up into smaller units so that the mass attains a granular structure of striking uniformity, especially in rotary kilns or other types of fermentors wherein the mass is in more or less constant movement.

It is, on the whole, most likely that the factors which cause granulation by practice of my method are largely identical with those that bring about the crumbly structure of fertile, humus-rich soil and which accounts for the characteristic friability and porosity of such soil. This favorable soil structure disappears when, for example, by excessive cropping the soil becomes deficient in humus and microbial life, as a result of which the organic matter separates from the silica particles to become powdery and thus subject to erosion and displacement by water and wind.

While it is possible that the other mineral nutrients contained in the exemplified silicon materials are also factors in causing the granulation, it is in my opinion, the silicon itself which is the dominant agent due to its greater resistance to decomposition as a result of which it remains relatively intact compared to particles of other mineral nutrient compounds which are more readily decomposed and absorbed for the buildup of microbial cell tissue.

The terms and expressions used above are employed as terms of description and not of limitation, and there is no intention by the use of such terms and expressions of excluding any equivalents of the features shown and described, or portions thereof.

This invention may be variously modified and embodied within the scope of the subjoined claims.

What is claimed is:

1. The method of manufacturing an organic fertilizer having a granular structure which comprises the steps of adding hard granulated silica mineral particles, the size of said particles being no larger than that passed by a 25 mesh screen and no smaller than 0.002 mm., to natural organic material prior to fermentation to serve as the nucleus for the adherence thereto of the colloidal organic substance and microbial tissue developed during fermentation of the natural organic material, said added silica mineral particles constituting from 3 to 10% of the weight of the natural organic material, subjecting the natural organic material with the added particles to an aerobic microbial fermentation process controlled so that the material reaches a temperature of at least 55° C. and a $CO_2$ concentration of at least 6%, during which processing portions of the colloidal organic substance and microbial tissue of the fermenting mass will adhere to each particle of the silica mineral particles, and recovering therefrom a natural fermented fertilizer of granular structure in which the granules are composed of a nucleus of the individual particles of said added silica mineral particles surrounded by colloidal organic substance and microbial tissue formed by the fermentation and adhered to said nucleus of the silica mineral particles.

2. The method in accordance with claim 1 in which the hard granulated silica mineral particles comprise beach sand.

3. The method in accordance with claim 1 in which the hard granulated silica mineral particles comprise crushed glass.

4. A granular natural organic fertilizer comprising a plurality of granules, each of said granules consisting of a nucleus of a particle of a hard granulated silica mineral, of a size no larger than that passed by a 25 mesh screen and no smaller than 0.002 mm., and a mass of colloidal organic substance and microbial tissue surrounding said nucleus and adhered thereto, said organic substance and microbial tissue being produced by the aerobic fermentation of natural organic material in the presence of said nucleus at a temperature of at least 55° C. and a $CO_2$ concentration of at least 6% to induce adhesion of said organic material and microbial tissue to each of said particles, the amount of said particles comprising from 3 to 10% by weight of the natural organic material subjected to said aerobic fermentation process.

References Cited by the Examiner
UNITED STATES PATENTS

| | | |
|---|---|---|
| 313,401 | 3/1885 | Breer. |
| 2,314,836 | 3/1943 | Seil. |
| 2,633,413 | 3/1953 | Eweson _____ 23—259.1 |
| 2,695,218 | 11/1954 | Eweson _____ 23—259.1 |
| 2,734,803 | 2/1956 | Ruskin _____ 71—9 |
| 2,806,771 | 9/1957 | Cuthbertson et al. ___ 23—214 |
| 2,880,074 | 3/1959 | Carmichael _____ 23—259.1 |
| 2,954,285 | 9/1960 | Carlsson et al. _____ 71—9 |
| 2,969,277 | 1/1961 | Carlsson _____ 71—64 |
| 2,969,279 | 1/1961 | Pierson _____ 71—9 |
| 3,022,142 | 2/1962 | Sackett _____ 71—64 |
| 3,055,744 | 9/1962 | Petersen _____ 71—64 |
| 3,068,076 | 12/1962 | Sackett _____ 23—259.1 |
| 3,083,081 | 3/1963 | Sharp et al. _____ 71—64 |

DONALL H. SYLVESTER, *Primary Examiner.*

ANTHONY SCIAMANNA, *Examiner.*